United States Patent Office 3,592,738
Patented July 13, 1971

---

3,592,738
PURIFICATION AND RECOVERY OF NEUTRAL AND ALKALINE PROTEASE USING CATIONIC SULFONATED PHENOL-FORMALDEHYDE RESIN
Leonard Keay, Florissant, Mo., assignor to Monsanto Company, St. Louis, Mo.
No Drawing. Filed Aug. 14, 1968, Ser. No. 752,462
Int. Cl. C07g 7/02
U.S. Cl. 195—66R                              13 Claims

ABSTRACT OF THE DISCLOSURE

Aqueous solution of protease, e.g., a clarified beer from *B. subtilis* microorganism production of enzymes or redissolved enzyme mixture, is treated with sulfonated phenol-formaldehyde cationic exchange resin to eliminate undesirable colored materials and any amylase present. Protease is adsorbed; amylase and most pigmented impurities are not. Neutral protease can be recovered or alkaline protease can be recovered; both can be recovered together or with fractionation when both are present. Use of neutral pH solutions for elution eliminates pigment elution problems, and use of low ionic strength solutions in preparation of resin and for adsorption allows recovery of maximum range of proteases. Fractionation is effected by use of moderate ionic strength solution for elution of neutral protease and higher ionic strength solution for alkaline protease. Where fractionation is not required, elution may be with high ionic strength solution.

BACKGROUND OF INVENTION (1) Field of invention

Enzymes; purification and isolation of protease and fractionation when both alkaline and neutral protease are present.

(2) Prior art

Production of protease and protease-containing enzyme mixtures by *Bacillus subtilis* microorganisms is known. When such enzyme mixtures contain amylase and colored impurities in addition to protease, separation and purification is difficult. Highly pigmented materials from the fermentation are usually present, and such colored impurities and amylase are difficulty separated from the desired protease. Commercial enzyme mixture products produced and sold according to U.S. Pat. 3,031,380 are undesirably highly colored. The prior art, as represented by the cited patent, in the absence of more satisfactory procedure, has employed an aqueous beer filtrate for isolation, with salting out of enzymes by $(NH_4)_2SO_4$ (ammonium sulfate), filtration, discard of the filtrate, redissolution of the filtration residue in water, reconversion to an $(NH_4)_2SO_4$ solution, raising the pH with ammonium hydroxide to precipitate amylase, filtration removal of amylase, and finally addition of further $(NH_4)_2SO_4$ to precipitate protease by downward adjustment of pH and isolation of the same. The individual enzymes then require further purification by dissolution in water, alkamine ion-exchanging to remove some pigment, and alcohol precipitation. It is apparent that this is not a simple procedure and its effectiveness leaves much to be desired, especially since protease and amylase fractions are still cross-contaminated.

A simple method of purification by employment of an ion exchange resin, whereby colored impurities could be removed from the desired protease, along with other undesired contaminants, such as amylase, and which would be applicable directly to a water-clear fermentation beer or solution of redissolved enzyme solids, would be highly desirable.

Okunuki, Hagihara and Ukita, U.S. Pat. 2,952,856, in attempting to solve this problem with relation to protease produced by *Bacillus subtilis* microorganisms, found that adsorption-elution using Duolite C–10, a highly coarse porous phenolic polymer having methylene sulfonic acid groups or side chains (otherwise referred to as a sulfonated phenol-formaldehyde resin, having omega-sulfonic acid groups) in the Na$^+$ form was a satisfactory way of purifying and isolating protease material produced by various *B. subtilis* microorganisms. However, this adsorption-elution process of Okunuki et al., although not clear from the above-cited patent, was of value only in the isolation of alkaline protease, as is manifest from the publication of Hagihara, Okunuki et al. appearing in J. Biochem (Tokyo) 45, 185 (1958), on pages 192–193. In addition the authors report that the resin adsorbed a fairly large quantity of colored impurities, melanine-like substances having a dark brown color and that amylase was also partially adsorbed and it is clear from the said paper that purification problems arose, especially toward the end of the elution when these pigments stated to elute. Crystallization of eluted protease from these pigmented solutions gave pigmented crystals from which color could not be removed even upon repeated recrystallization. Therefore, an improved process would be highly desirable, which did not suffer from the disadvantage of color contamination during the elution process. In addition, it would be highly desirable to have available a process of adsorption-elution whereby either neutral or alkaline protease, or both together or each individually if both are present, could be procured substantially free from colored impurities and if desired also free from amylase, when also present in the starting enzyme material.

It is well known that various enzymes have various different activities or capacities. Protease is effective in the digestion of protein material by hydrolysis or bond-splitting activity, neutral protease being active at substantially neutral pH's whereas alkaline protease is active at more alkaline pH's. When in combination, enzymes are frequently subject to disgestion or endogenous deterioration. For this reason, and also because it is highly desirable to have specific enzymes available for use in various specific applications, the desirability of having the individual enzymes, as well as efficient methods for the purification and separation of enzyme mixtures into their individual components, is readily apparent.

SUMMARY OF THE INVENTION

The present invention involves treatment of a water-clear solution containing enzyme, e.g., protease or mixtures thereof, for example, a beer filtrate or aqueous solution of redissolved enzyme solids, with a sulfonated phenol-formaldehyde cationic exchange resin, thereby to selectively adsorb the protease with substantial freedom from undesired coloring matter which remains in solution, or on the resin upon elution with the observance of certain critical conditions. The process moreover permits facile removal of color bodies from the protease, adsorption of both neutral and alkaline protease, and separation of the protease with fractionation, if desired, by adhering to critical parameters during adsorption and elution, and is a striking and unpredictable advance in the art.

It has now been found that the conditions employed by Okunuki et al. can be employed to adsorb protease and pigment on the said resin, but that by eluting under different conditions, namely, by employing neutral pH solutions, e.g., having a pH of about 6–8, preferably about 6.5–7.5, such as NaCl solutions, a much cleaner protease product is obtained with no pigment or discoloration problems such as encountered by Okunuki et al. using an alkaline buffer eluant. This result can be obtained even when using a solution of the same ionic strength and pH as employed by Okunuki et al. for the adsorption step.

It has further been found that, when different conditions are also employed for the adsorption step, namely, a lower ionic strength during the adsorption and also employment of a low ionic strength solution in preparation of the resin, neutral protease alone, alkaline protease alone, both neutral and alkaline protease together, or neutral and alkaline protease separately by fractionation, can be readily obtained by the adsorption-elution process, depending upon the composition of the starting solution initially contacted with the resin, the exact product of the elution depending upon conditions employed for the elution.

Thus, instead of using an alkaline eluting agent of Okunuki et al., but rather employing an eluting solution having a neutral, e.g., about pH 6-8, preferably about pH 6.5-7.5, the following results can be obtained:

If either neutral or alkaline protease is present alone, a high ionic strength solution can be used for the elution and will elute whichever protease is present.

When both neutral and alkaline protease are present and it is unnecessary to fractionate them, then an eluting solution having a high ionic strength may be used to elute both proteases from the resin at once.

When both neutral and alkaline protease are present and it is desired to isolate them separately, they may be fractionally eluted from the column by first employing an eluting solution of moderate ionic strength, resulting in elution of the neutral protease, followed by an eluting solution of high ionic strength, thereby eluting alkaline protease substantially free from neutral protease.

When the terms "moderate ionic strength" and "high ionic strength" are employed, they are respectively intended to describe a solution having a molarity (1) between about 0.05 and 0.2, and (2) greater than 0.2, usually up to about 1.0.

Thus, by in any event employing different eluting conditions than Okunuki et al., a greatly improved purification can be effected at the elution stage. By employing different conditions for the adsorption stage and also in preparation of the resin for the adsorption step, together with varying the ionic strength of the solution employed for elution, which to repeat is always effected with a relatively neutral pH solution rather than with the strongly alkaline eluting agent of Okunuki et al., the procurement of neutral protease in addition to alkaline protease is rendered entirely feasible, as well as fractionation of the neutral from the alkaline protease, if desired.

The unpredictability of the effects which will be obtained by changing conditions in the adsorption-elution art, especially relating to enzymes, is already established, and is well-stated in the Okunuki et al., U.S. Patent 2,952,586, column 2, lines 19 through 44.

The results of the process of the present invention are therefore entirely unpredictable, first, that a cleaner alkaline protease product can be obtained without pigmentation problems by employing neutral conditions for the elution, and moreover that neutral protease can also be obtained as well as fractionation between neutral and alkaline protease by varying both the conditions of the adsorption (and also preparation of the resin) as to ionic strength of the solution in addition to the ionic strength of the solution employed in the elution step, although maintaining the relatively neutral pH conditions during the elution, as previously indicated.

In addition, amylase is removed as a contaminant by the present adsorption-elution procedure, since it is not adsorbed to any substantial extent under the conditions employed according to the invention and can be washed out, as with water or extremely low ionic strength solutions, so as not to contaminate subsequent protease fractions.

The distinctions between the process of the present invention and that of Okunuki et al. are immediately apparent from an inspection of the procedures employed and the details of the conditions of adsorption and elution involved. Okunuki et al. prepare their resin using a buffer of 0.3 Normality at a pH of 6-8. To obtain adsorption of neutral protease and alkaline protease, the present applicant employs much lower levels of ionic strength, up to about 0.05 M molar, for example 0.005 molar, or even plain water.

Okunuki et al. prepare their resin in the same buffer as used for adsorption whereas, preferably after neutralization to a pH of about 7, the present applicant generally washes his resin with water to remove salts, or with 0.1% calcium acetate solution for enzyme stabilization (quite in contrast with the much higher ionic strength equilibration of Okunuki et al.), especially in the case where both alkaline and neutral protease are to be adsorbed before proceeding with adsorption.

Then, and most importantly, Okunuki et al. elute with a buffer of 0.5-0.7 Normality, employing a pH of 9-11 for their eluting solution, which comprises 0.1 M ammonium hydroxide, 0.1 M disodium phosphate, and 0.5 M sodium chloride, all employed together.

Again in contrast, the present applicant elutes with a relatively neutral pH solution, usually a solution of high ionic strength, i.e., above about 0.2 M, e.g., a 1 M NaCl solution, to remove both neutral protease and alkaline protease together, but without the pigmentation problem experienced by Okunuki et al. when they elute with their stronger buffer solution at a higher pH. Alternatively, the present applicant selectively elutes the neutral protease with a weaker solution, of more moderate ionic strength, for example 0.05-0.2 M, e.g., a 0.1 M phosphate buffer and then can, if desired, elute the alkaline protease with a solution of higher ionic strength, for example, above about 0.2 M and usually up to about 1 M, e.g., 1 M NaCl, but always using a relatively neutral pH solution for the elution.

The ionic strength of the solution from which adsorption is effected obviously plays a major role in the unpredictable adsorption phenomena, according to the findings of the present invention, as well as the pH and ionic strength of the solution employed in the unpredictably selective elution of the present invention.

Thus, in summary, it has now been found, unpredictably, that protease selectively adsorbed on a sulfonated phenolformaldehyde resin can be conveniently and selectively eluted therefrom free of pigment and most other undesirable impurities, using a substantially neutral eluant. If neutral protease is present in the starting enzyme solution from which adsorption is effected, neutral protease can also be adsorbed by using low ionic strengths and, again by using a substantially neutral eluant and by varying the concentration of eluting solution, both proteases can be eluted either together or separately, if both are present, in any case substantially free of amylase and highly pigmented impurities.

OBJECTS

The provision of a process having any or all of the above-enumerated advantages is an object of the invention. Additional objects will become apparent hereinafter, and still others will be obvious to one skilled in the art.

GENERAL DESCRIPTION OF THE INVENTION

The starting material for the process of the present invention is a water-clear fermentation beer, as obtained by filtration or centrifugation, or an aqueous extract of the enzyme or enzyme mixture. The latter is obtained by redissolving a crude solid precipitated enzyme or enzyme mixture, as may be obtained by precipitation of the enzyme-containing solids from a clarified fermentation beer using an excess of water-miscible organic solvent in which the enzyme is insoluble, with further clarification if necessary. The solvent employed for such precipitation is preferably a polar solvent selected from the group consisting of lower-alkanols, e.g., isopropanol, lower-alkyl ketones, e.g., acetone, and cyclic ethers, e.g., tetrahydrofuran and dioxane. Isopropyl alcohol and acetone are preferred solvents. Hereinafter the starting material will sometimes be referred to as the "solution." In either case, the starting material should be a water-clear fluid, which will ordinarily not contain solids visible to the naked eye, hence the designation "water-clear." The invention can also be applied to any other water-clear aqueous solution of protease together with undesirable colored impurities, whether of natural or synthetic origin.

The first essential step in the process of the invention, as already stated, is the selective adsorption of protease, including both neutral and alkaline protease, if desired, as produced by fermentation culture of a protease-producing strain of B. subtilis, employing a sulfonated phenol-formaldehyde cation exchange resin as the adsorbent. The protease is adsorbed and subsequently eluted, whereas the colored impurities are unadsorbed or, to the extent adsorbed, uneluted under the conditions of the elution.

According to the invention, if amylase is also present in the starting solution, this is not adsorbed or, to the extent adsorbed, not eluted under the conditions of the elution. The pigment which is adsorbed to a certain extent, even though considerable may be removed earlier in the overall process as by adsorption using DEAE-Cellulose or other anion exchange agent, is definitely not eluted under the conditions of the elution. If amylase is removed at an earlier stage of the total process, then it does not enter into the adsorption-elution step at all.

Sulfonated phenol-formaldehyde cation exchange resins are readily available commercially. They may be used according to the invention in a batch, continuous, or column process, or in similar manner, according to the established art of adsorption-elution and chromatography. The resin, e.g., column, may advantageously be adjusted to a neutral pH and washed with water or dilute calcium acetate solution, e.g., 0.1% aqueous solution, or with a very dilute buffer, e.g., the adsorbing solution, prior to adsorption therewith.

The protease is adsorbed onto the resin by bringing it into contact therewith, in the form of an aqueous solution thereof. The conditions of the adsorption may be those of the prior art when adsorption of alkaline protease alone is of interest, but where neutral protease is present and is to be adsorbed as well as alkaline protease, the solution should have a low ionic strength, below about 0.05 molarity, to enable adsorption of the neutral as well as the alkaline protease on the resin. The pH should preferably be between about 6 and 8, and advantageously about 6–7.5, especially where neutral protease is present and its adsorption is desired. The pH of the starting enzyme-containing solution will usually be between about 5.5 and 7, preferably 6 to 6.5, and thus the desired starting pH range is readily obtainable if not a normal pH range for the starting enzyme-containing solution.

The solution may be stabilized by the addition of calcium acetate or other suitable soluble calcium salt, for example, the gluconate, the chloride, or the like. Preferably the stabilizing amount of calcium salt is up to about 0.2%, and the preferred form is an about 0.1% calcium acetate aqueous solution. Such solutions are readily obtained by redissolving the solid obtained by solvent precipitation of the enzyme or enzyme mixture, and filtering or centrifuging the resulting solution, or by directly filtering or centrifuging the fermentation beer, and adding the necessary buffer or salt to the concentration desired.

The adsorption is preferably conducted employing a solution containing up to about 2.5% of dissolved solids, preferably about 1% of dissolved solids, or an enzyme level not greater than about 50,000 enzyme units per milliliter as determined by the Anson variation of the well-known Kunitz casein digestion method.

If it is desired to wash the adsorbent, after protease has been adsorbed thereon, for further removal of undesired impurities, whether in column form or otherwise, water, aqueous organic solvent, e.g., acetone solutions, or a dilute solution of a soluble calcium salt, for example an about 0.02% solution of a calcium salt, preferably calcium acetate, may advantageously be employed. Such solutions as are employed for washing of the column containing the adsorbed protease should be at or about a neutral pH and of low ionic strength such that protease is not eluted. Elution of the protease from the column may then be effected employing a solution of somewhat greater ionic strength, also at or about neutral pH, as further disclosed in detail hereinafter.

The second essential step in the process involves elution of the adsorbed protease. Elution of protease from the resin is effected by means of an eluting solution comprising an aqueous buffer, at an ionic strength greater than about 0.05 M but below the point where crystallization of the buffer occurs. Advantageously, aqueous buffer of ionic strength greater than 0.2 M is employed. Usually a solution of up to about 1.0 M is employed when no fractionation of protease is involved. However, when both neutral and alkaline protease are present, and fractionation is desired, use of moderate ionic strength (0.05–0.2 M) to elute the neutral protease, followed by a solution of high ionic strength (greater than 0.2 M, usually up to about 1.0 M) to elute alkaline protease is mandatory. For this purpose, 0.1 M phosphate buffer followed by a 1.0 M sodium chloride solution have been found optimum, although other solutions of moderate and high ionic strengths may be used instead. These may follow washing with water in case amylase is present, if it is desired to eliminate any adsorbed amylase prior to the protease elution. In any event, however, the elution is with a relatively neutral pH solution, one having a pH of about 6–8, and preferably about 6.5–7.5, to avoid contamination with highly colored impurities. The elution pH may frequently advantageously be slightly higher than that employed during adsorption.

Precipitation of the protease from the eluted fractions may be effected using solid ammonium sulfate or other suitable precipitant, e.g., sodium sulfate or, if phosphate buffer is used as the eluting agent, the eluted protease solution may be further treated with a calcium salt, for example, calcium acetate, in an amount up to about 2% by weight, in such case with adjustment of pH slightly upwardly to about 7.5 to produce a precipitate of calcium phosphate, which may then be removed by physical means such as filtration or centrifugation. Dialysis of the protease-containing supernatant, recentrifugation or filtration, and lyophilization further increases the purity of the protease or proteases, as will be apparent.

Although cooling to any temperature below room temperature has been found advantageous, it is desirable that, for best results, both the eluting solution and the starting enzyme-containing solution be chilled to 10° centigrade or below, and about 5° centigrade has been found an extremely useful, attainable, and operative temperature for carrying out the method of the invention. If the eluting and adsorbing solutions are not cooled, as previously described, less satisfactory purification, separations, and yields of desired protease fractions are obtained.

When operating in the foregoing manner, recoveries of colorless protease are usually between fifty and sixty percent of the protease adsorbed by the resin, and frequently as high as 70% or even greater percentages of the protease originally adsorbed on the resin. The process of the invention allows a clear, efficient fractionation of neutral from alkaline protease in a simple and convenient manner, if desired, and gives a colorless protease product which is additionally purified of other impurities and pigments which are not adsorbed, or not eluted, the final purity and composition of the protease product depending upon the additional steps employed at an earlier stage in the overall process, as already stated.

Thus, the neutral protease produced by a protease-producing strain of *Bacillus subtilis*, for example *B. subtilis* strain AM, can be isolated essentially free of alkaline protease, or vice versa, or together, and in any case, free of amylase and pigment-free, from a starting source of clarified fermentation beer or redissolved crude solids precipitated from a fermentation beer by solvent addition, depending upon the exact conditions employed during adsorption of the protease and subsequent elution from the resin.

Starting enzyme-containing beers can be obtained from microorganism fermentation, e.g., production of enzymes by bacteria, using well-known fermentation methods such as those generally described in Kirk-Othmer, Encyclopedia of Chemical Technology, 8, 173–204.

The exact activity of the enzymes employed as starting material depends on the method of preparation and is not critical to the present invention providing only that the starting solution has the desired protease activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH, the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology, 30, 291 (1947) and in Methods of Enzymology, 2, 33 by Academic Press N.Y. (1955). Amylase activity is generally determined by the well-known dinitrosalicylic acid method of Bernfeld.

A particularly effective source of mixed enzymes which can be used as starting material in the present invention is a mutated *Bacillus subtilis* organims. The process for producing this organism and enzymes therefrom is described in U.S. Patent 3,031,380. A culture of this *Bacillus subtilis* (strain AM) organism has been deposited with the United States Department of Agriculture, Agricultural Research Service, Northern Utilization Research and Development Division, 1815 North University St., Peoria, Ill. 61604, and has been assigned No. NRRL B-3411. The enzymatically active material produced by this organism has been found generally to consist of two proteases, approximately 65–75% neutral protease (activity at a pH of 7.0–7.5) and about 25–35% alkaline protease (activity at a pH of 9–10). A significant amount of amylase is also present. There are generally about 700 thousand to about 1.2 million units of neutral protease activity per gram and about 250 thousand to about 400 thousand units of alkaline protease activity per gram of precipitated solids as determined by Anson's variation of the Kunitz "Casein" method. There are generally about 300 thousand to 350 thousand units of amylase activity per gram as determined by the Bernfeld method. As pointed out in the cited patent, the relative proportions of protease to amylase will vary depending on the exact conditions of growth of the microorganism, bu we have found that the neutral and alkaline protease and the amylase will be produced, in at least some amounts, almost regardless of changes in the culture medium and other conditions of growth of the microorganism.

Another source of enzymes which can be used as starting material in accord with the present invention is *B. subtilis* strain NRRL 644, *B. subtilis* strain NRRL 941, and *B. subtilis* strain IAM 1523 (Japanese Culture Collection). Still other *B. subtilis* and additional microorganisms are available which produce protease or a mixture of proteases or protease and amylase, at least to a limited if not optimum extent.

DESCRIPTION OF THE PREFERRED EMBODIMENTS

The following examples are given by way of illustration only, and are not to be construed as limiting.

General outline of preparation of fermentation beer

A culture of *Bacillus subtilis* AM is inoculated into a sterile slurry of grains and other nutrient material (such as rice bran, corn meal, fish meal, wheat bran, Enzose [TM—about 50–80% dextrose and the balance higher saccharides, being the dried mother liquor remaining from dextrose manufacture by enzymatic hydrolysis of corn starch], distillers solubles, corn steep liquor, etc.) containing protein, carbohydrate, minerals, and growth factors. The vessel is agitated and aerated by bubbling sterile air through the inoculated slurry. The pH may be controlled or left to achieve its own natural pH. Aliquots of the beer are removed for assay at various times and, when enzyme production is apparently a maximum, the fermentation beer is then centrifuged and/or filtered prior to enzyme isolation.

Some details and examples of this type of enzyme production method are given generally in U.S. Patents 2,530,210 of C. V. Smythe, B. B. Drake and C. E. Neubeck (to Rohm & Haas Company, Nov. 14, 1950), and 2,549,465 of J. C. Hoogerheide and E. G. Laughery (to Pabst Brewing Company), Apr. 17, 1951) and particularly in U.S. Patent 3,031,380 of Apr. 24, 1962.

The foregoing procedure, especially that of U.S. Patent 3,031,380, is productive of a fermentation beer containing the desired enzyme mixture. For clarification purposes to give a water-clear beer for use as starting material, this fermentation beer may merely be centrifuged and/or filtered. Alternatively, the solid enzyme mixture may be precipitated by adding an excess of solvent, e.g., isopropanol or acetone, to the fermentation beer either without prior filtration or centrifugation or after a prior centrifugation and/or filtration, which is productive of a solid precipitate comprising an enzyme mixture, which may then be readily redissolved in water to give a water-clear enzyme solution which may be used as starting material in the process of the invention. Obviously, the starting solution, by whichever procedure procured, may be subjected to additional centrifugation and/or filtration if desired to upgrade the quality of the starting enzyme solution.

EXAMPLE 1

Preparation of *B. subtilis* AM alkaline protease by chromatography on Duolite C–10 ion exchange resin (adsorption conditions of Hagihara)

Preparation of C–10 resin.—500 g. Duolite C–10 resin (TM—Diamond Alkali Co., a coarse, highly porous sulfonated phenol-formaldehyde resin) was ground in a pestle and mortar and stirred in 8 liters of N/1 NaOH for one hour, then allowed to settle and the fines and washings removed by decantation. The resin was washed 3 times by decantation with tap water and then retreated with N/1 NaOH and rewashed 4 times with distilled water. The resin was converted to the H+ form by washing with excess 2 N HCl for one hour, followed by 3 distilled water rinses. The resin was then suspended in 0.2 M sodium phosphate buffer pH 6.5 and, while stirring, the pH was raised to 7.0 by addition of 50% NaOH. After 2 hours, the liquid was removed by decantation and the resin resuspended in 0.2 M phosphate pH 6.5 and allowed to stand overnight and the pH rechecked and adjusted to 7.0 if necessary.

Isolation of alkaline protease according to the present invention.—180 g. crude enzyme mixture was stirred in 1800 ml. distilled water at 5° C. for 20 minutes. 1800 ml. cold (5° C.) acetone was added slowly with stirring followed by 36 g. calcium acetate and the mixture stirred for 20 minutes at 5°. The precipitate was removed by centrifugation and a further 1800 ml. acetone added to the supernatant and the precipitate collected by centrifugation and redissolved in 750 ml. distilled water. 40 g. DEAE-Cellulose (adjusted to pH 6.5 with acetic acid) was added and the mixture stirred for 20 minutes and filtered. The DEAE-Cellulose treatment was repeated to give a pale yellow solution.

220 ml. of solution was applied to a 20 x 320 mm. column of Duolite C–10 at 6° C. The column was washed with 100 ml. distilled water, 150 ml. 20% acetone, 100 ml. distilled water, and the protease eluted with 1 M NaCl. The protein was precipitated by addition of ammonium sulfate to 0.6 saturation, the protein redissolved in 0.1% calcium acetate solution, dialyzed against distilled water for 2 hours, and lyophilized. Weight of colorless amylase-free, pigment-free product=640 mg. Protease activity: $3.12 \times 10^6$ $\mu$/g. at pH 7; $3.20 \times 10^6$ $\mu$/g. at pH 10.

Isolation of alkaline protease according to Hagihara et al. (comparative).—180 g. enzyme mixture was stirred at 5° C. for 20 minutes in 1800 ml. distilled water. 1800 ml. cold (5°) acetone was added with stirring, followed by the addition of 36 g. calcium acetate. After stirring for a further 20 minutes, the precipitate was removed by centrifugation. A further 1800 ml. acetone was added to the supernatant and the precipitate collected by decantation and redissolved in about 750 ml. distilled water, 40 g. DEAE-Cellulose (previously adjusted to pH 6.5 with acetic acid) was added and the mixture stirred at pH 6.5 for 20 minutes then filtered to give 660 ml. yellow filtrate.

220 ml. yellow filtrate was applied to a 15 x 280 mm. column of Duolite C–10 in 0.2 M phosphate pH 6.5. The column was then washed with distilled water, 20% aqueous acetone, distilled water and then the protease eluted with 0.1 M $Na_2HPO_4$, 0.5 M NaCl, 0.1 M $NH_4OH$. The recovery of alkaline protease was about 33%, but about one quarter of this was contaminated by yellow-green pigment.

EXAMPLE 2

Isolation of *B. subtilis* alkaline protease by chromatography on Duolite C–10 (adsorption conditions of Hagihara)

200 g. crude *B. subtilis* AM enzyme mixture was stirred in 2 liters water at 5° C. for 30 minutes. 2 liters cold (5°) acetone was added slowly with stirring, followed by 40 g. calcium acetate. After stirring at 5° for 20 minutes the precipitate was removed by centrifugation and a further 2 liters of acetone was added slowly. The gummy precipitate was allowed to settle and was collected by decantation. The precipitate was dissolved in 1500 ml. 0.1% calcium acetate and treated with 100 g. DEAE-Cellulose (adjusted to pH 6.4 with acetic acid) for 30 minutes and filtered. The DEAE-Cellulose treatment was repeated. The pale yellow solution had a volume of 1560 ml.

Elution according to the invention.—780 ml. of solution was applied to a 30 x 350 mm. Duolite C–10 column (prepared as in Example 1). The column was washed with 600 ml. distilled water, 600 ml. 20% acetone, 1 liter distilled water and the enzyme eluted with 1 M NaCl. The enzyme was precipitated with ammonium sulfate, redissolved in 400 ml. 0.01% calcium acetate, dialyzed overnight at 5° against 0.01% calcium acetate (16 liters) and lyophilized. Weight of colorless product: 1.920 g.

Assay, protease: pH 7–$4.05 \times 10^6$ $\mu$/g.; pH 10–$4.32 \times 10^6$ $\mu$/g.

EXAMPLE 3

Isolation of *B subtilis* neutral and alkaline protease by chromatography on Duolite C–10

200 mg. partly purified *B. subtilis* AM enzyme mixture (with amylase and some pigment removed by Ca acetate/isopropanol or acetone fractionation and DEAE-Cellulose treatment respectively) was dissolved in 20 ml. water and applied to a 2 x 20 cm. column of Duolite C–10 which had been pretreated as in Example 1, but equilibrated in distilled water to pH 6.5 instead of in 0.2 M phosphate buffer. The column was washed with distilled water and the colorless amylase-free proteases then eluted with 1 M NaCl. The recovery of neutral protease was 55% and of alkaline protease 67%.

EXAMPLE 4

Separation of alkaline and neutral protease by chromatography on Duolite C–10

200 mg. partly purified *B. subtilis* AM enzyme mixture in 25 ml. 0.2 M phosphate pH 6.5 as in Example 3 was applied to a 2 x 20 cm. column of Duolite C–10 as in Example 3 except that the column had been equilibrated with 0.2 M phosphate pH 6.5. The column was washed with 0.2 M phosphate pH 6.5. After the first protein peak had eluted, the column was eluted with 1 M NaCl which gave a second elution peak. The first elution peak contained 56% of the neutral protease with 22% of the alkaline protease and the second peak contained 52% of the alkaline protease with 10% of the neutral protease. The protease solutions were colorless and amylase-free.

EXAMPLE 5

Separation of *B. subtilis* amylase, neutral protease and alkaline protease by chromatography on Duolite C–10 ion exchange resin 120 mg. partly purified *B. subtilis* enzyme mixture (see Example 3) and 10 mg. *B. subtilis* amylase were dissolved in 12 ml. water and applied to a 2.0 x 15 cm. column of Duolite C–10 equilibrated in water (see Example 3). The column was washed with distilled water until the first protein peak (yellow colored) eluted. The column was then washed with 0.1 M phosphate pH 6.5 until another peak eluted, then washed with 1 M NaCl until a further peak eluted. The first peak contained all of the amylase with no neutral protease and just a trace of alkaline protease. The second peak contained 45% of the neutral protease with a little alkaline protease, while the third peak contained 94% of the alkaline protease with a little neutral protease. The protease solutions were colorless and amylase-free.

EXAMPLE 6

Isolation of alkaline and neutral protease mixture from *B. subtilis* enzyme mixture by chromatography on Duolite C–10 resin A crude precipitated *B. subtilis* AM enzyme mixture (net weight about 30 grams) was dissolved in 1 liter distilled water at 5° C. 900 ml. cold (5°) acetone was added slowly with stirring, followed by addition of 20 g. solid Ca acetate. After stirring at 5° for 20 minutes, the solids were removed by centrifugation. A further 1 liter of cold (5° C.) acetone was added to the supernatant with stirring. The precipitate thus formed was collected by centrifugation and redissolved in 1 liter 0.1% Ca acetate. The deep yellow solution was treated with DEAE-Cellulose (adjusted to pH 7.0 with acetic acid) at pH 7.0 for 20 minutes at 5°, whereafter the resin was removed by filtration.

The solution was applied to a 7.0 x 30 cm. column of Duolite C–10 adjusted to pH 6.5 in distilled water (see Example 3). The column was washed with distilled water (2 liters), then with 1 liter 20% acetone followed by 2 liters distilled water. The proteases were eluted with 1 M NaCl. The enzymes were precipitated from the eluate by addition of ammonium sulfate (600 g./liter), redissolved in 0.1% Ca acetate, dialyzed against 0.1% calcium acetate at 5° and then lyophilized. Weight=4.00 g. of an about equal mixture of colorless amylase-free neutral and alkaline proteases. Assay: $7.2 \times 10^6$ protease units at pH 7; $4.1 \times 10^6$ protease units at pH 10.

EXAMPLE 7

Isolation of *B. subtilis* neutral and alkaline proteases from a fermentation beer by chromatography on Duolite C–10 resin A *B. subtilis* AM fermentation beer was clarified by filtration using Hyflo-Supercel (TM-diatomaceous earth) as a filter aid. Two liters of the filtered beer were adjusted to pH 7.0, centrifuged to remove a faint precipitate, and then applied at 5° to a 7 x 22 cm. column of Duolite C–10 at pH 7.0 in distilled water (see Example 3). The column was then washed successively with 1500 ml. distilled water, 2 liters 20% acetone, and 2 liters distilled water. The proteases were then eluted with 1 M NaCl, precipitated from the eluate with ammonium sulfate (600 g./liter), redissolved in 0.1% Ca acetate, and lyophilized. Weight of colorless amylase-free product was 680 mg.; protease assay $5.9 \times 10^6$ $\mu$/g. at pH 7; $2.6 \times 10^6$ $\mu$/g. at pH 10.

EXAMPLE 8

Isolation and separation of *B. subtilis* neutral and alkaline protease by chromatography on Duolite C–10 resin Two g. crude *B. subtilis* AM enzyme mixture was dissolved in 200 ml. cold distilled water, pH adjusted to 7.0, and then solution applied to a $5.0 \times 20.0$ cm. column of Duolite C–10 resin adjusted to pH 7.0 in distilled water. The column was washed with water and then eluted first with 0.12 M phosphate pH 6.5 and then with 1 M NaCl. The material eluted by the phosphate buffer contained no amylase or pigment and had 24% of the neutral protease together with very little alkaline protease. The material eluted by the sodium chloride solution contained 59% alkaline protease with only a little neutral protease and was also pigment-free and amylase free.

EXAMPLE 9

A clarified fermentation beer from the fermentation of *B. subtilis* var. amylosacchariticus, a known producer of neutral protease, is treated in the manner of Example 3. Similar results are obtained.

The same results are obtained using water-clear fermentation beers from the other *B. subtilis* strains previously mentioned.

EXAMPLE 10

A synthetic mixture comprising a water-clear solution of neutral protease and alkaline protease is prepared and adjusted to a pH of approximately 6.5. The product is treated in accord with the procedure of Example 5. Fractionation of the solution into its neutral and alkaline protease fractions is readily effected.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

I claim:

1. Process for the isolation of substantially colorless protease from a water-clear aqueous solution containing protease together with colored impurities, which comprises the step of adsorbing the protease on a sulfonated phenol-formaldehyde resin, characterized by the step of selectively eluting the protease from the resin using an eluant solution having a relatively neutral pH between about 6 and about 8, colored impurities being left behind in the process.

2. Process of claim 1, wherein the eluting solution has a pH between about 6.5 and 7.5.

3. Process of claim 2, wherein protease is eluted from the resin using an eluting solution with a high ionic strength greater than about 0.2 molarity.

4. Process of claim 1, further characterized in that the starting water-clear aqueous solution contains both neutral protease and alkaline protease and wherein the protease is adsorbed on the resin from a solution thereof having a low ionic strength up to about 0.05 molarity, whereby both neutral and alkaline protease are adsorbed on the resin.

5. Process of claim 4, wherein the adsorption is effected at a relatively neutral pH between about 6 and 7.5.

6. Process of claim 4, wherein protease is eluted from the resin using an eluting solution having a high ionic strength greater than about 0.2 molarity, both neutral and alkaline protease being eluted together.

7. Process of claim 4, wherein neutral protease is eluted from the resin using an eluting solution having a moderate ionic strength between about 0.05 and 0.2 molarity, and wherein alkaline protease is subsequently eluted from the resin using an eluting solution having a relatively high ionic strength greater than about 0.2 molarity.

8. Process of claim 7, wherein the ionic strength of the relatively high ionic strength solution is between about 0.2 and about 1 molarity.

9. Process of claim 7, wherein neutral protease is eluted from the resin with an eluting solution comprising about 0.1 M phosphate buffer solution and wherein alkaline protease is eluted from the resin with an eluting solution comprising about 1 M sodium chloride solution.

10. Process of claim 1, wherein the starting solution is a clarified fermentation beer from the fermentation production of enzyme by a protease-producing strain of a Bacillus species or a clarified aqueous solution of previously-precipitated and redissolved solids from such Bacillus species fermentation beer.

11. Process of claim 1, wherein the starting solution is a clarified fermentation beer from the fermentation production of enzyme by a neutral and alkaline protease-producing strain of a Bacillus species, or a clarified aqueous solution of previously-precipitated and redissolved solids from such Bacillus species fermentation beer.

12. Process of claim 1, wherein the starting solution is a clarified fermentation beer from the fermentation production of enzyme by a protease-producing strain of *Bacillus subtilus* or a clarified aqueous solution of previously-precipitated and redissolved solids from such *Bacillus subtilis* strain fermentation beer.

13. Process of claim 1, wherein the starting solution is a clarified fermentation beer from the fermentation production of enzyme by a neutral and alkaline protease-producing strain of *Bacillus subtilis*, or a clarified aqueous solution of previously-precipitated and redissolved solids from such *Bacillus subtilis* strain fermentation beer.

References Cited

UNITED STATES PATENTS 2,952,586   9/1960   Okunuki et al. _____ 195—66

LIONEL M. SHAPIRO, Primary Examiner

UNITED STATES PATENT OFFICE
CERTIFICATE OF CORRECTION

Patent No. 3,592,738  Dated July 13, 1971

Inventor(s) Leonard Keay

It is certified that error appears in the above-identified patent and that said Letters Patent are hereby corrected as shown below:

Column 1, line 47, "difficulty" should read -- difficultly --. Column 2, line 1, "2,952,856" should read -- 2,952,586 --; line 21, "stated" should read -- started --. Column 7, line 39, "organims" should read -- organism --. Column 9, line 68, "B substilis" should read -- B. subtilis --. Column 11, line 26, "then" should read -- the --.

Signed and sealed this 25th day of July 1972.

(SEAL)
Attest:

EDWARD M. FLETCHER, JR.
Attesting Officer

ROBERT GOTTSCHALK
Commissioner of Patents